Patented Nov. 17, 1931

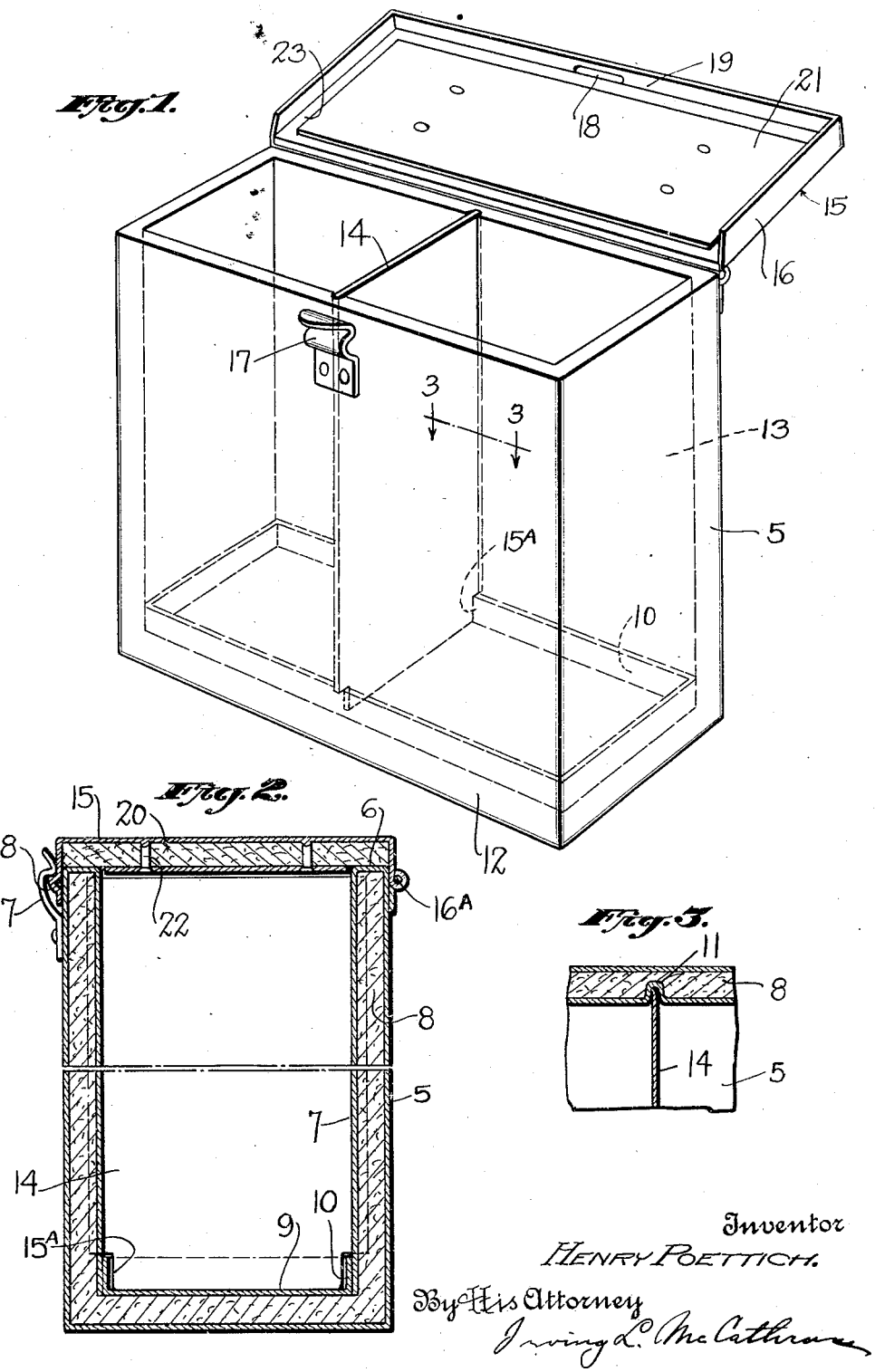

1,832,502

UNITED STATES PATENT OFFICE

HENRY POETTICH, OF NEW YORK, N. Y.

INSULATED RECEPTACLE

Application filed September 22, 1928. Serial No. 307,670.

This invention relates to containers and in particular to air-tight receptacles of an insulated character.

A particular object of the invention is to provide an insulated container in which foodstuff or perishable merchandise may be kept for long periods of time at the proper temperature without danger of spoiling.

A further object of the invention is to provide a container having inner and outer metallic casing walls and having interposed therebetween a suitable insulating substance which will prevent temperature exchange between the walls and atmosphere whereby the temperature within the container will be dissipated or increased.

A still further object of the invention is to provide an insulated container in which a partition may be employed to divide the container into a plurality of compartments which are insulated from each other.

To enable others skilled in the art to fully comprehend the underlying features of by invention that they may embody the same in the various modifications in structure and relation contemplated, drawings depicting a preferred form have been annexed as part of this disclosure and in such drawings, similar reference characters denote corresponding parts through all the views, of which, Figure 1 is a view in perspective of my improved receptacle, the lid thereof being shown open to illustrate the construction of the interior of the receptacle and under side of the cover.

Figure 2 is a sectional view in elevation illustrating the construction of my receptacle, and Figure 3 is a section taken on the line 3—3 of Figure 1 showing how the partition engages one of the side walls of the container to divide the same into a plurality of compartments.

Referring to the drawings in detail, the container comprises the outer casing wall 5 which is preferably made of metal and which, on all four sides of the container is bent over to form a top portion 6 and an inner wall portion or lining 7. Interposed between the inner and outer lining 7 and 5 respectively is the insulating material 8 which may be a rubber compound, wool, shoddy or any material such as asbestos, which prevents the transfer of the heat from the outer wall to the inner wall of the receptacle. In order that the bottom edges of the inner lining 7 may be effectively sealed, use is made of a bottom piece 9 of similar material which is provided with the upturned edges 10, these edges being suitably soldered or otherwise connected to the lower edges of the inner wall 7.

In order that the receptacle may be divided into any number of compartments, I provide a vertical depression 11 in the front and rear walls 12 and 13 respectively and in these depressions is slid a metallic partition 14, the upper end of which is arranged to be flush with the upper end of the receptacle, sufficient space being allowed for the closing of the cover. The cover is indicated by the number 15 and is made of sheet metal, similar to the sort used in the making of the receptacle body, the cover being provided with the side and end edges or flanges 16 which are arranged to slightly overlap the top edges of the receptacle when the cover is closed, the cover being secured to the receptacle through the medium of a suitable hinge 16—A and arranged to be retained in its closed position by the catch 17 which engages a suitable projection 18 on the front flange 19 of said cover. The cover is provided with a filler of insulating material 20 which is held in position through the medium of the plate 21 which is riveted as at 22 to to cover 15. The edges of the plate 21 are spaced as at 23 from the flanged edge 16 of the cover so that the upper edge of the receptacle 5 may fit against the insulating material of the cover 20 so that the receptacle is substantially sealed.

The depression 11 in the walls of the receptacle extend to a point adjacent the top edge of the flanges 10 are provided on the bottom 9 and the partition piece 14 is provided with the corner cut out 15—A which permits it to rest on the bottom 9 and to readily pass over the upstanding flanges 10 of said bottom.

It will be evident that in a construction of this character, a receptacle is provided in which foodstuff or other perishable merchandise may be kept at the proper temperature for long periods of time without danger of spoiling.

It is also evident that the outside and inside walls of the container may be made from a single sheet of material and may be bent up and inwardly to provide the outer and inner walls which are maintained in their proper relation through the medium of a suitable flanged bottom piece.

It is also evident that in a construction of this character, any suitable insulating material may be used between the inner and outer walls of the receptacle and that any number of partitions may be employed to provide the compartments necessary.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention what I claim as new and desire to secure by United States Letters Patent is:—

A receptacle comprising inner and outer spaced side and end walls, an outer bottom, the walls and bottom being formed integrally, and said side walls being vertically grooved to receive a partition, an annularly flanged bottom wall spaced from said outer bottom, insulating material between said walls and bottom member, a cover for said receptacle comprising spaced walls, and insulation between said cover walls.

In testimony whereof I affix my signature.

HENRY POETTICH.